United States Patent
Janisch

(10) Patent No.: US 7,140,338 B2
(45) Date of Patent: *Nov. 28, 2006

(54) SNOWMOBILE REMOTE IGNITION SYSTEM

(75) Inventor: Darrel R. Janisch, Thief River Falls, MN (US)

(73) Assignee: Arctic Cat, Inc., Thief River Falls, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 11/091,188

(22) Filed: Mar. 28, 2005

(65) Prior Publication Data

US 2005/0224034 A1 Oct. 13, 2005

Related U.S. Application Data

(63) Continuation-in-part of application No. 10/353,281, filed on Jan. 28, 2003, now Pat. No. 6,871,624.

(51) Int. Cl.
*F02N 11/08* (2006.01)

(52) U.S. Cl. .................... 123/179.2; 180/167

(58) Field of Classification Search ............... None
See application file for complete search history.

(56) References Cited

U.S. PATENT DOCUMENTS

| 4,653,442 | A | * | 3/1987 | Swenson | 123/179.3 |
| 5,435,408 | A | * | 7/1995 | Sekinobu | 180/184 |
| 6,060,981 | A | * | 5/2000 | Landes | 307/10.4 |
| 6,871,624 | B1 | * | 3/2005 | Janisch | 123/179.2 |

* cited by examiner

*Primary Examiner*—Andrew M. Dolinar
(74) *Attorney, Agent, or Firm*—Black Lowe & Graham, PLLC

(57) ABSTRACT

Herein is disclosed a snowmobile configured to start in response to a remote-start signal. One embodiment of the invention includes a snowmobile outfitted with a remote starting system. The remote starting system, itself, includes a remote starting activation switch that transmits a radio frequency signal to a remote starter module to initiate starting of an engine within the snowmobile. The remote starter module receives the radio frequency signal from the remote starting activation switch and, in response to receiving the radio frequency signal, initiates closure of a switch interposed between a battery and a starter motor, thereby causing the starter motor to crank and start the engine of the snowmobile. The engine may be shut off by the remote starting system if the engine RPM exceeds a threshold value.

17 Claims, 5 Drawing Sheets

SNOWMOBILE REMOTE IGNITION SYSTEM

CROSS REFERENCE TO RELATED APPLICATIONS

This application is a continuation in part of application Ser. No. 10/353,281 filed Jan. 28, 2003 now U.S. Pat. No. 6,871,624, which application is incorporated herein by reference in its entirety.

FIELD OF THE INVENTION

The invention relates generally to personal recreational vehicles, and more particularly to a remote ignition system for use with engines that power personal recreational vehicles, such as snowmobiles and all-terrain vehicles.

BACKGROUND OF THE INVENTION

The snowmobile industry is competitive, requiring successful companies to continually create new snowmobile features, thereby creating a competitive advantage. A great deal of time and effort has been spent in making snowmobiles more comfortable and enjoyable for their riders. Consumers, in turn, appreciate these conveniences and develop brand loyalty.

One particular aspect of snowmobiling that serves as an inconvenience to consumers is the process of warming a snowmobile's engine. On particularly cold days, a snowmobile should be permitted to idle for as long as ten or fifteen minutes to allow its engine to warm; warm engine oil allows for better lubrication and, therefore, reduced engine wear. Additionally, a warm engine exhibits more complete combustion and better performance.

Heretofore, engine warming has involved the operator of the snowmobile trudging into the cold, starting his or her snowmobile, and staying with the snowmobile while it idled until warm. Additionally, the operator of the snowmobile may be required to wait for hand and thumb warmers to reach their proper temperature. This process is time consuming and needlessly subjects the operator to cold weather.

A snowmobile that eliminated the need for its operator to be physically present while starting and idling the snowmobile would be of great value to its operator. Such a snowmobile would allow its operator to immediately begin riding a warmed-up snowmobile, thereby doing away with the discouraging task of waiting for a cold engine to become warm. Further such a snowmobile could be programmed to automatically perform the task of periodically starting the engine, so as to keep the engine warm.

For the aforestated reasons, it is desirable to devise a means by which a snowmobile engine may be started in the absence of physical presence by its operator. Additionally, for both safety and theft prevention purposes, the scheme should ensure that the snowmobile is immobile while idling without its operator.

SUMMARY OF THE INVENTION

Against this backdrop, the invention has been created. One embodiment of the invention includes a snowmobile outfitted with a remote starting system. The remote starting system, itself, includes a remote starting activation switch that transmits a radio frequency signal to a remote starter module to initiate starting of an engine within the snowmobile. The remote starter module receives the radio frequency signal from the remote starting activation switch and, in response to receiving the radio frequency signal, initiates closure of a switch interposed between a battery and a starter motor, thereby causing the starter motor to crank and start the engine of the snowmobile.

Another aspect of the invention relates to a method of controlling on/off operation of a snowmobile from a remote location. The method includes determining if a driver authorization condition is detected, determining an engine RPM, determining whether the engine RPM exceeds an RPM threshold level, and interrupting engine operation of the snowmobile if the driver authorization condition is not detected and the engine RPM exceeds the RPM threshold level.

DETAILED DESCRIPTION OF THE INVENTION

A snowmobile or other personal recreation vehicle (e.g., all-terrain vehicle, motorcycle or other straddle mount vehicle) may be made to start in response to a signal transmitted from a remote starter switch. Thus, an operator of such a vehicle may initiate transmission of an ignition-start signal, perhaps by pushing a button on a key chain-sized remote starter switch. In response to the ignition-start signal, a remote starter module (which is electrically integrated in the ignition system of a snowmobile) activates the starter motor to start the engine. The vehicle can be left to idle, until the engine is warm. If the engine fails to start, the system may be designed to automatically progress through a pre-designated ignition re-try sequence.

Various security features, some of which are unique to snowmobiles, may be integrated into the remote starter system. For example, the system can be designed to detect motion of the vehicle, and in response thereto, interrupt engine ignition if an appropriate driver authorization condition is not detected. One example of a driver authorization condition is the occurrence of the vehicle's key being inserted in the ignition switch and turned to an "on" or "run" position (the inference being that the authorized driver must be present for the key to be inserted and turned "on"). Other examples of driver authorization conditions exist, including the occurrence of an appropriate access code being keyed into a keypad associated with the vehicle, or the occurrence of a biometric test being successfully performed upon a would-be operator of the vehicle.

Additionally, safety features may be optionally integrated into the remote starter system. For example, the system may be designed to disable the remote starting capability if the vehicle's hood is open. Also, the system may be designed to disable the remote starting capability if the engine is already running or if the vehicle is in motion. Remote starting capability also can be disabled whenever the owner is detected as being present at the vehicle (e.g., the key is inserted in the engine and turned to the "on" or "run" position). Remote starting or operation of the vehicle may be disabled if an engine RPM exceeds a threshold engine RPM level.

Figure 1:
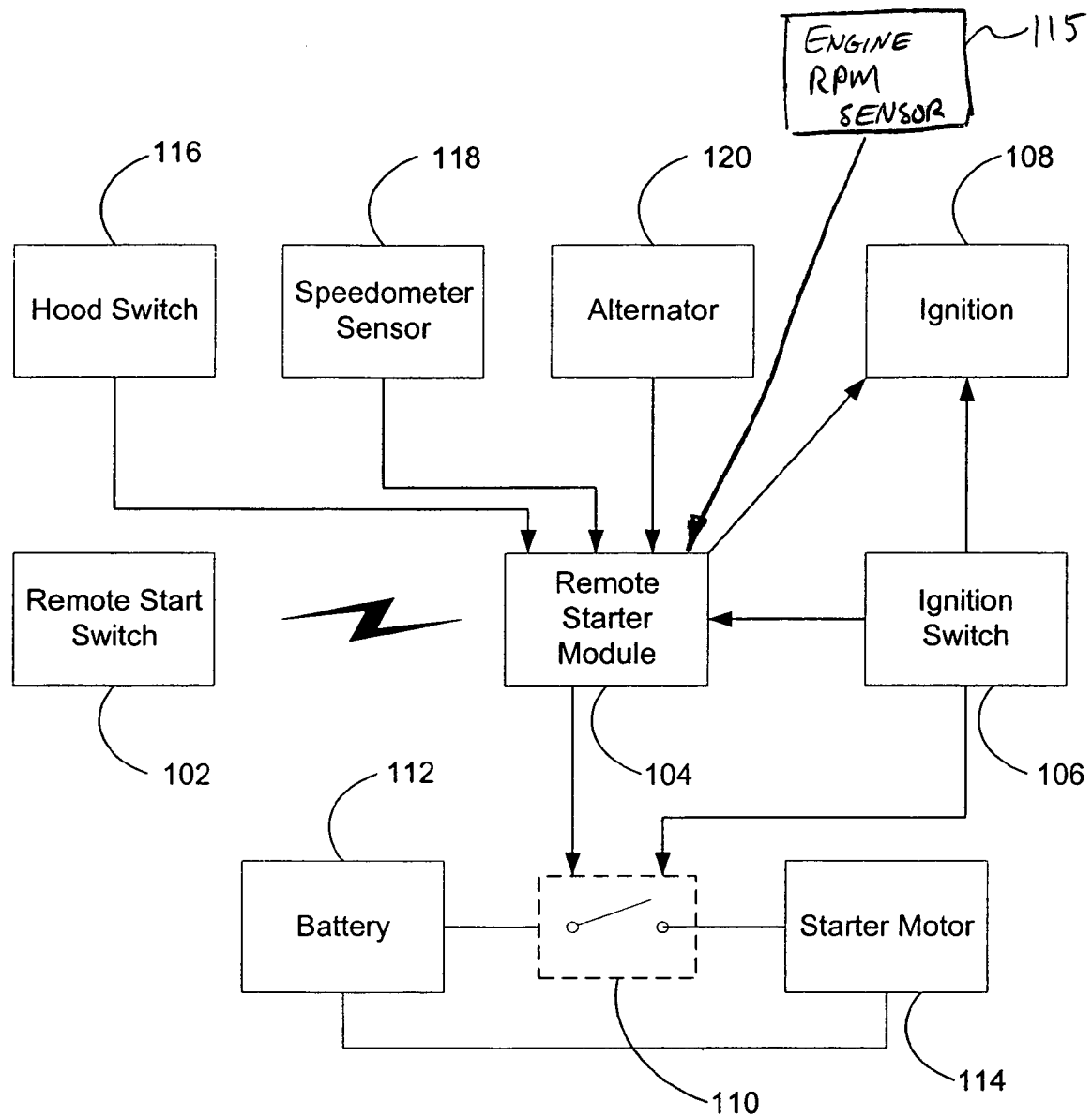
FIG. 1 depicts a schematic view of a remote ignition system for a snowmobile, in accordance with one embodiment of the invention.

FIG. 1 depicts a remote ignition system 100 for a vehicle. Principles of the present invention can be equally applicable to other personal recreational vehicles such as ATVs, motorcycles, and other straddle mount vehicles, two seated side-by-side off-road and on-road personal recreational vehicles, and the like. The remote ignition system 100 includes a remote starter switch 102 and a remote starter module 104. The remote starter module 104 is in communication with an ignition switch 106 and an ignition system 108 of a vehicle. The remote starter module 104 is also in communication with a switch 110 that is interposed between a battery 112 and a starter motor 114 of a vehicle.

The remote starter switch 102 contains a radio frequency (RF) transmitter that emits an RF signal, for example, in response to depression of a button on the remote starter switch 102. The RF signal is received by the remote starter module 104, which reacts to reception of the signal by attempting to start the engine of the vehicle. A remote starter switch 102 and a remote starter module 104 may be matched so that a second remote starter switch is incapable of activating the remote starter module 104. For example, a matching remote starter switch and remote starter module 104 may operate on a unique frequency or may share a unique code. Remote starter switches 102 with the above-described capabilities are known in the art.

During operation, the remote starter module 104 monitors the airwaves, seeking the presence of an RF signal from the remote starter switch 102. In response to detecting the sought-after RF signal, the remote starter module 104 causes the switch 110 to close, thereby completing a circuit between the battery 112 and the starter motor 114, causing the starter motor 114 to operate. Although not depicted in FIG. 1, the remote starter module 104 may communicate with other mechanisms of the vehicle to accomplish the act of starting the vehicle. For example, the remote starter module 104 may activate a solenoid (not pictured) for the purpose of positioning a gear to couple the starter motor 114 to the engine (not pictured). Additionally, the remote starter module 104 may activate an electronic fuel injection system (not pictured), which in turn activates a fuel pump (not pictured) to draw gasoline from a gas tank (not pictured) into the engine (not pictured).

As shown in FIG. 1, the remote starter module 104 is in communication with the ignition system 108. The ignition system 108 may include a vehicle's engine (not pictured), a capacitor discharge ignition (not pictured), spark plugs (not pictured), and a high-voltage generating circuit (not pictured). During operation of the engine, the engine powers the capacitor discharge ignition, which transfers a high-voltage impulse to an appropriate spark plug, thereby ensuring ignition in the proper cylinder of the engine. The remote starter module 104 may communicate with a switch interposed at any point in the ignition system, thereby interrupting engine ignition and turning off the vehicle. The remote starter module 104 may interrupt engine ignition in response to various forms of stimuli, as described below with reference to FIGS. 3A and 3B.

The ignition switch 106 may be in communication with the remote starter module 104, so that when a key is inserted into the ignition switch 106 and turned to an "on" or "run" position, the remote starter module 104 becomes deactivated. Many possible embodiments of this arrangement exist. For example, insertion of a key into the ignition switch 106 followed by turning to the key to the "on" or "run" position may simply cut off power to the remote starter module 104. Similarly, insertion of a key into the ignition switch 106 and turning the key to the "on" or "run" position may initiate delivery of a command to the remote starter module 104, instructing the module 104 to power down or enter into an inactive state.

Figure 2:
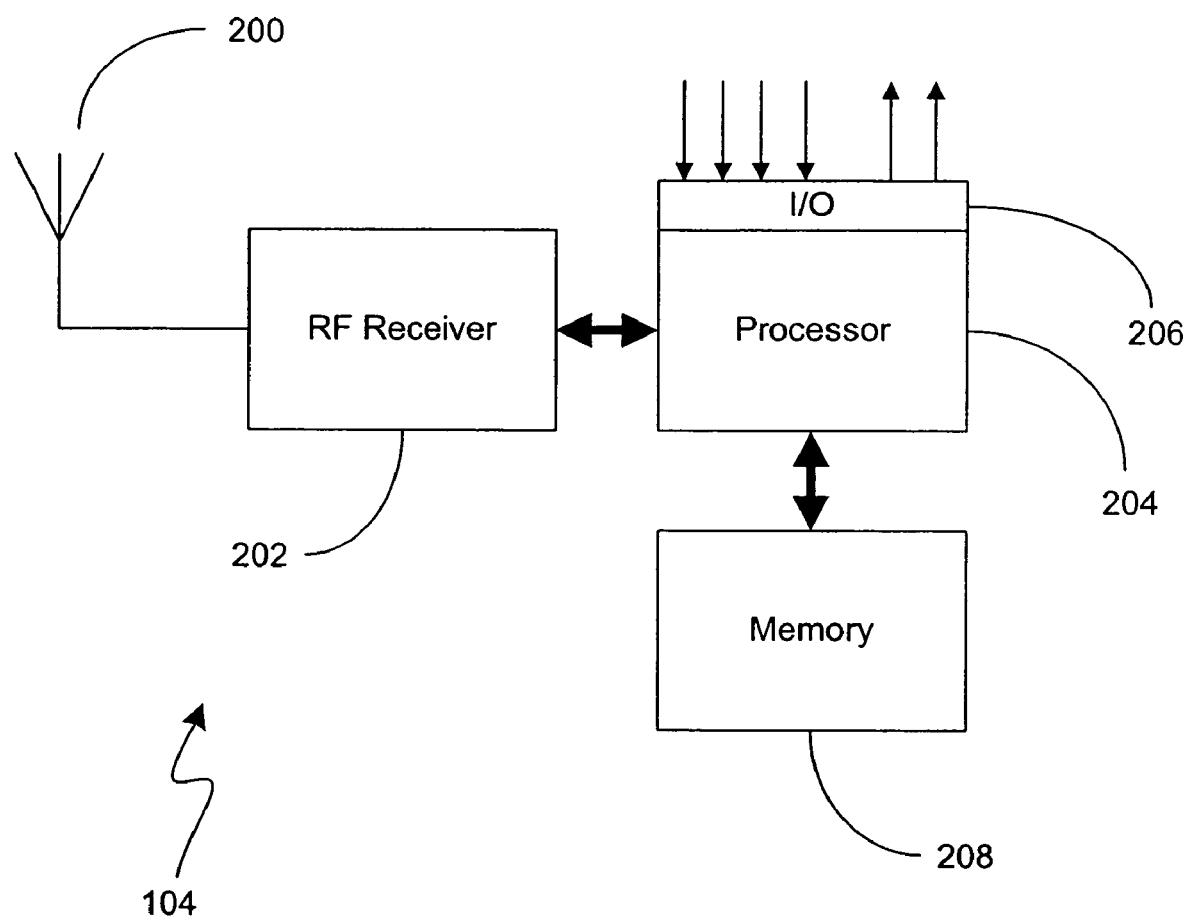
FIG. 2 depicts a block diagram of one possible embodiment of the remote starter module.

FIG. 2 depicts a block diagram of one possible embodiment of the remote starter module 104. The module 104 includes an antenna 200, which is coupled to an RF receiver 202. The RF receiver 202 receives an RF signal transmitted by the remote starter switch 102, recovers the baseband signal from the RF signal, and sends the signal to a processor 204 which validates the data and determines whether an appropriate ignition-start signal has been received. The processor 204 may be in data communication with various external input and/or output sources via input/output ports 206 (this is described in greater detail below). Further, the processor 204 is in data communication with a memory unit 208. The memory unit 208 stores software/firmware that governs the behavior of the remote starter module 104.

Figure 3A:
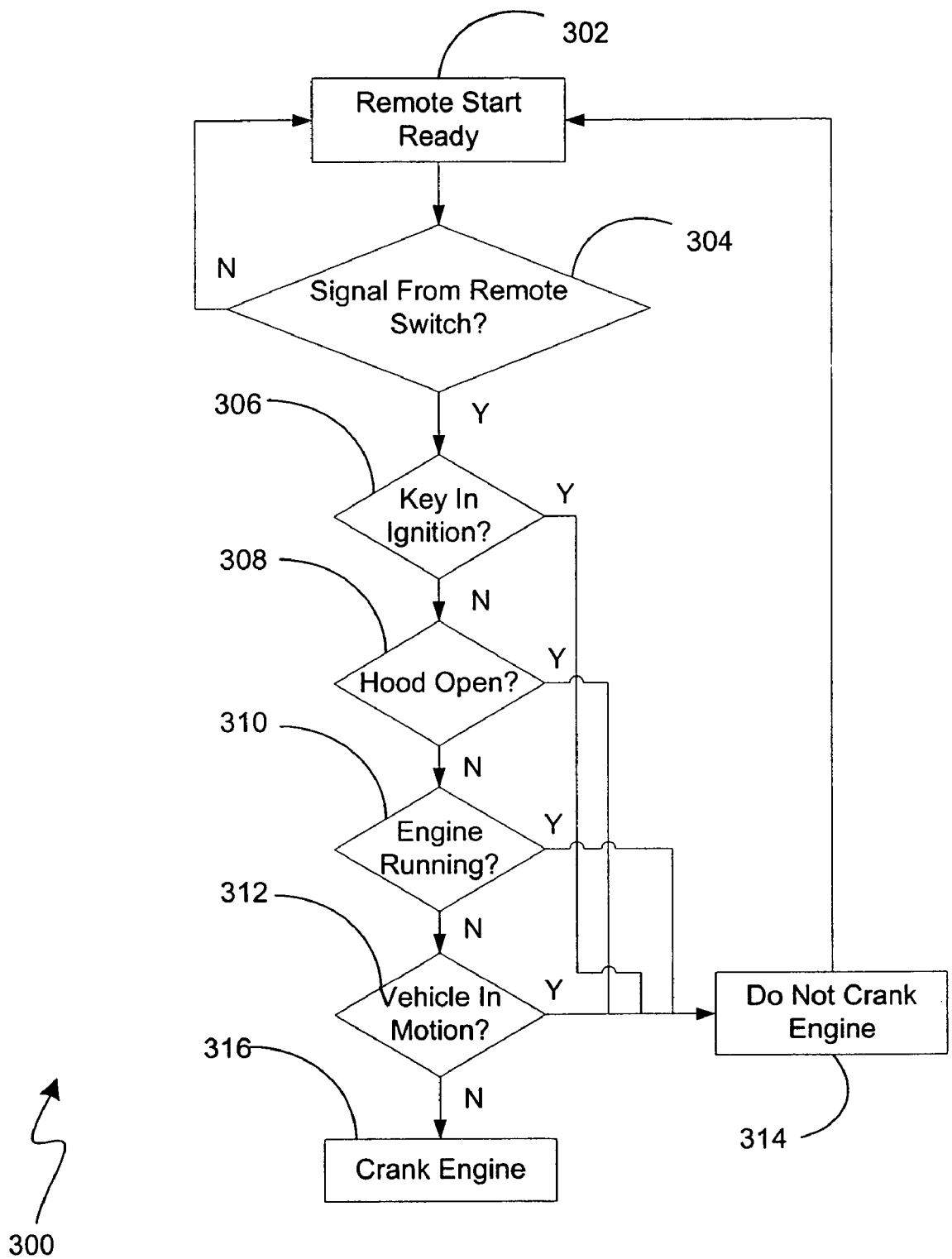
FIG. 3A depicts a remote ignition method, in accordance with one embodiment of the invention.
Figure 3B:
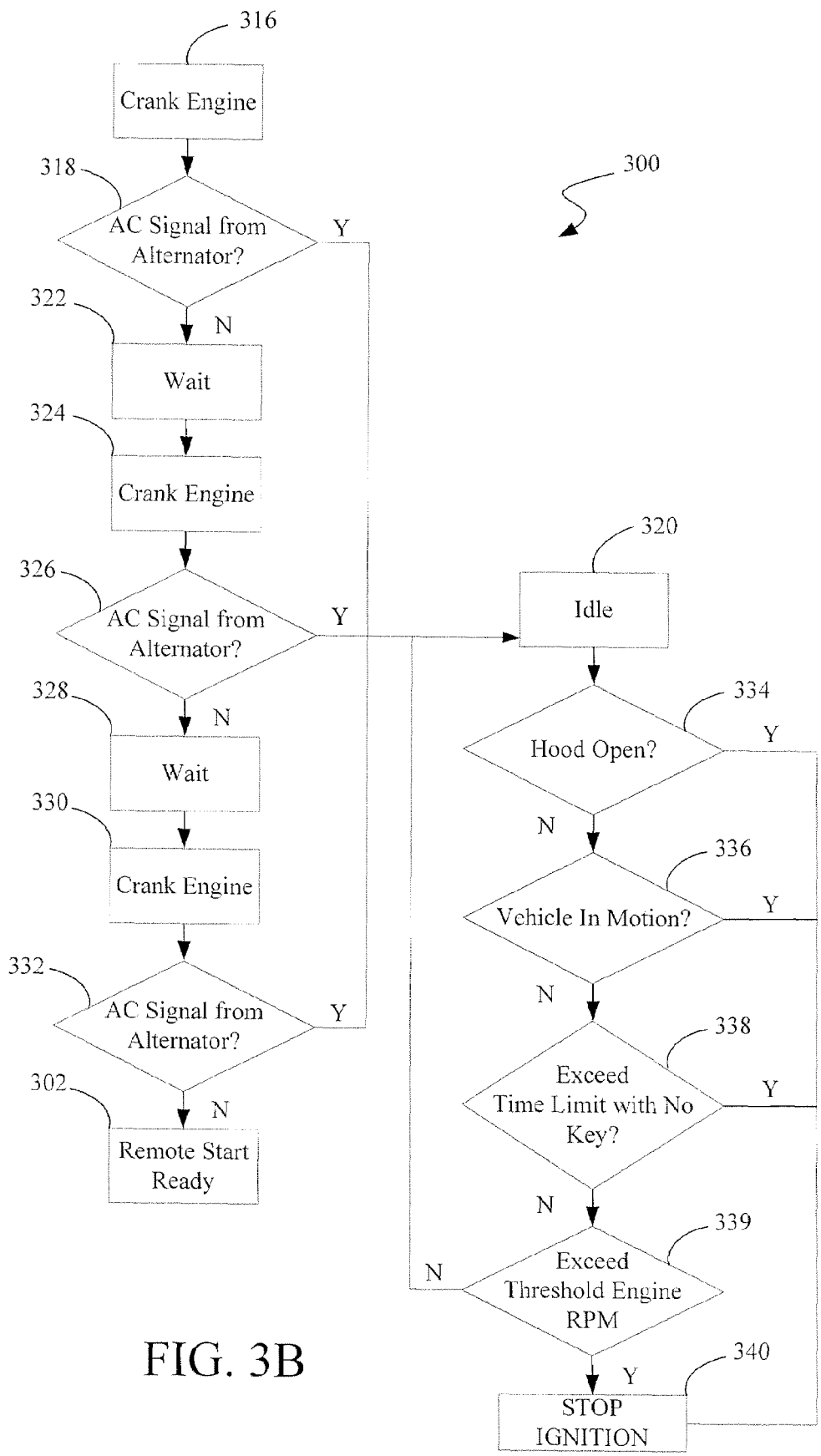
FIG. 3B depicts a remote ignition method, in accordance with one embodiment of the invention.

The following discussion with reference to FIGS. 3A and 3B describes a method that may be embodied in software/firmware stored in the memory unit 206 depicted in FIG. 2. The discussion assumes an embodiment of the remote ignition system 100 that includes the following input/output sources: (1) a hood switch 116 that indicates whether the engine hood (not pictured) of the vehicle is open or closed; (2) a speedometer sensor 118 that transmits a signal indicating detected motion of the vehicle; (3) an alternator 120 that produces an alternating current (AC) signal in response to being powered by the vehicle's engine (not pictured); and (4) an engine RPM sensor 115 that transmits a signal indicating an RPM of the engine. The hood switch 116, speedometer sensor 118, and alternator 120 may communicate with the processor 204 via input/output ports 206. Additionally, intermediary signal-conditioning circuitry may be interposed between the processor 204 and the hood switch 116, speedometer sensor 118, alternator 120, and RPM sensor 115. Of course, it will be understood by those of skill in the art that the input/output sources may communicate with the processor 204 by means other than use of input/output ports. For example, input/output sources may be in data communication with the processor 204 via a memory-mapping scheme, as is known in the art. Finally, the method depicted in FIGS. 3A and 3B is understood to be capable of implementation via construction of an application-specific integrated circuit (ASIC), rather than in firmware or software.

Together, FIGS. 3A and 3B depict a remote ignition method 300. As shown in FIG. 3A, the method 300 commences in a ready state 302, in which an ignition-start signal is awaited. In operation 304, a query is executed to determine if the ignition-start signal has been received. If the ignition-start signal has not been received, control returns to the ready state 302. Thus, operations 302 and 304 cooperate to form a loop, from which the ignition-start signal is the source of exit. Upon receiving the ignition-start signal, control is passed to a series of safety/security queries 306, 308, 310 and 312. These queries 306, 308, 310 and 312 may be performed in any order; the safety/security queries 306, 308, 310 and 312 prevent the vehicle from being started under conditions that may be unsafe and/or unsecure.

As depicted in FIG. 3A, the first safety/security query 306 executed determines whether a key is inserted in the ignition switch 106 and turned to the "on" or "run" position. If a key is inserted and turned to the "on" or "run" position, the engine will not be cranked, as shown in operation 314, and control returns to the ready state 302. This query 306 is optional, and its purpose may be accomplished by simply cutting off power to, or otherwise bypassing, the remote starter module 104 when a key is inserted in the ignition switch 106 and turned to the "on" or "run" position. If no key is inserted in the ignition switch 106 and turned to the "on" or "run" position, control passes to query 308, in which it is determined whether the engine hood is ajar. This determination may be made by detecting the state of a hood switch 116. If the engine hood is ajar, the engine will not be cranked, as shown in operation 314, and control returns to the ready state 302. If, on the other hand, the engine hood is closed, control passes to query 310, in which it is determined whether the engine is already running. This determination may be made by looking for an AC signal emanating from the alternator 120. If the engine is already running, the engine will not be cranked, as shown in operation 314, and control returns to the ready state 302. Otherwise, control is passed to query 312, in which it is determined whether the vehicle is in motion. One means of making this determination is discussed with reference to FIG. 4. If the vehicle is in motion, the engine will not be cranked, as shown in operation 314, and control returns to the ready state 302. If the vehicle is not in motion, the engine is cranked, as shown in operation 316 (depicted at the bottom of FIG. 3A and the top of FIG. 3B). As discussed previously, the process of cranking the engine may involve: (1) supplying energy to a starter motor 114; (2) supplying energy to a solenoid (not pictured) to position a gear (not pictured) that couples the starter motor 114 to the engine (not pictured); and (3) activating an electronic fuel injection system, which in turn activates a fuel pump to draw fuel from the fuel tank (not pictured) into the engine (not pictured). The length of time for which the engine should be cranked is an empirical matter that should be determined for each model of vehicle independently. However, as an approximation, the engine may be initially cranked for 0.7 seconds.

Discussion of the remote ignition method 300 continues with reference to FIG. 3B, in which the engine crank operation 316 is depicted at the top. After the engine has been cranked in operation 316, control is passed to query operation 318, in which it is determined whether the engine has begun to run. This determination may be made by seeking an alternating current output emanating from the alternator 120. If the engine has, in fact, started, control is passed to idle state 320, in which the engine is permitted to idle. Otherwise, control passes to a wait state 322, after which the engine is again cranked, as shown in operation 324. The optimal amount of time to wait between attempts at cranking the engine varies from model to model and should be determined empirically. As an approximation, however, the wait duration may be approximately 5 seconds. Further, in one embodiment of the invention, the duration of cranking employed in operation 324 may be greater than that which is employed in operation 316. For example, if the engine was cranked for 0.7 seconds in operation 316, the engine may be cranked for 0.9 seconds in operation 324. After the engine has been cranked in operation 324, control is passed to query operation 326, in which it is determined whether the engine has begun to run. If the engine has begun to run, control is passed to idle state 320, in which the engine is permitted to idle. Otherwise, control passes to a wait state 328, after which the engine is again cranked, as shown in operation 330. Once again, the wait duration may be approximately 5 seconds. In one embodiment of the invention, the duration of cranking employed in operation 330 may be greater than that which is employed in operation 324. For example, if the engine was cranked for 0.9 seconds in operation 324, the engine may be cranked for 1.1 seconds in operation 330. As before, after the engine has been cranked in operation 330, control is passed to query operation 332, in which it is determined whether the engine has started. If the engine has started, control is passed to idle state 320, in which the engine is permitted to idle. Finally, if after the third attempt the engine fails to start, control is passed to the ready state 302, whereupon the remote starter module 104 again awaits reception of the ignition-start signal. Although the presently discussed embodiment describes an engine ignition re-try scheme involving three attempts at starting the engine, other numbers of re-tries may be employed and are within the scope of the invention.

While the engine is permitted to idle in operation 320, a series of safety/security queries 334, 336, 338, and 339 are executed. These queries 334, 336, 338, and 339 may be performed in any order; the safety/security queries 334, 336, 338, and 339 prevent the vehicle from continuing to run under conditions that are unsafe and/or unsecure. As depicted in FIG. 3B, the first safety/security query 334 executed determines whether the engine hood is ajar. As stated earlier, this determination may be made by detecting the state of a hood switch 116. If the engine hood is ajar, engine ignition is interrupted, as depicted in operation 340. The act of interrupting engine ignition may be accomplished by breaking the circuit created by the spark plugs, the capacitor discharge ignition system, and the high-voltage generator. On the other hand, if the engine hood is closed, control passes to operation 336, in which it is determined whether the vehicle is in motion. As stated earlier, one means of making this determination is discussed with reference to FIG. 4.

If the vehicle is determined to be in motion 336, engine ignition is interrupted, as depicted in operation 340. The motion of the vehicle can be determined in a variety of ways including, for example, the system described below with reference to FIG. 4.

Control can passed to operation 338 when it is determined the hood is closed 334 and the vehicle is not in motion 336. In some embodiments, the operation 338 is independent of operations 334, 336. In operation 338 it is determined whether the engine has been idling for a period longer than an idle threshold. If so, engine ignition is interrupted, as depicted in operation 340. One purpose of the idle threshold imposed by operation 338 is to prevent the engine from overheating by idling for too long. Another purpose is to prevent unintentional abandonment of the vehicle while the vehicle is running. The idle duration can be determined empirically for each engine model. However, as an approximation, the idle duration may be no more than approximately 15 minutes. If the threshold has not been surpassed, control is returned to idle state 320, whereupon the engine is permitted to idle.

Operation 339 includes a determination of whether the engine RPM exceeds a threshold level. This determination may involve using the engine RPM sensor 115 shown in FIG. 1. This feature may be useful in combination with other features of the present invention described above, or may be used by itself to control operation of the vehicle. Engine RPM is typically relevant to clutch engagement for continuously variable transmission vehicles. In snowmobiles and other automatic transmission vehicles, clutch engagement occurs at different RPM levels depending on a number of considerations such as, for example, the type of engine (two-stroke verses four-stroke), the idle speeds, and whether the snowmobile is set for relatively smooth or racing transmission engagement. Many four-stroke engines can idle at a lower RPM (e.g., 1000–1500 RPM) as compared to two-stroke engines (e.g., 1800–2400 RPM). Idle speeds can vary; for example, from slow idle (1800 RPM for two-stroke engines) to fast idle (2400 RPM for two-stroke engines). Most snowmobiles are set with a clutch engagement of about 3000 to about 4500 RPM whereas many racing snowmobiles are set at about 5000 to about 6000 RPM.

While clutch engagement may be most relevant to continuously variable transmission vehicles such as snowmobiles, similar principles for threshold RPM may be application to manual and automatic transmissions used for other types of personal recreational vehicles such as ATVs, motorcycles and the like vehicles.

Engine RPM can be determined using many different methods. In one example, engine RPM is determined using the frequency of the alternator signal or the magneto signal from the engine. This signal can be interpreted by the remote start module described above when the number of pulses per revolution is known. The engine RPM can also be determined using the amount of current drawn from the battery or alternator of the vehicle, the amount of noise generated at the engine exhaust, or the pressure pulses on the intake and exhaust manifolds of the engine. Regardless of the method or system used to determine the engine RPM, the determined engine RPM can be used by the remote start module to interrupt engine ignition to stop the engine.

The engine RPM threshold amount may vary depending on the above mentioned considerations related to engine RPM. In one example, the threshold engine RPM is established relative to the clutch engagement RPM. For example, the threshold may be within 100 RPM of the vehicle's clutch engagement RPM. In another example, the threshold engine RPM is established relative to the fast idle RPM. For example, the threshold may be at least 100 RPM in excess of the vehicle's fast RPM.

In one specific example, the threshold engine RPM is set in the range of about 2000 to about 3500 RPM, more preferably in the range of about 2800 to about 3200 RPM, and most preferably at about 3000 RPM.

Although not explicitly depicted in FIG. 3B, the loop defined by operations 320, 334, 336, 338, and 339 is traversed only for so long as a driver authorization condition is not detected. Once a driver authorization condition is detected (e.g., the key is inserted into the ignition and turned to the "on" or "run" position), the safety/security measures defined by the loop are no longer performed. For example, the ignition will not be killed (as shown in operation 339) in response to the engine RPM exceeding a threshold level if the driver authorization condition is detected.

Figure 4:
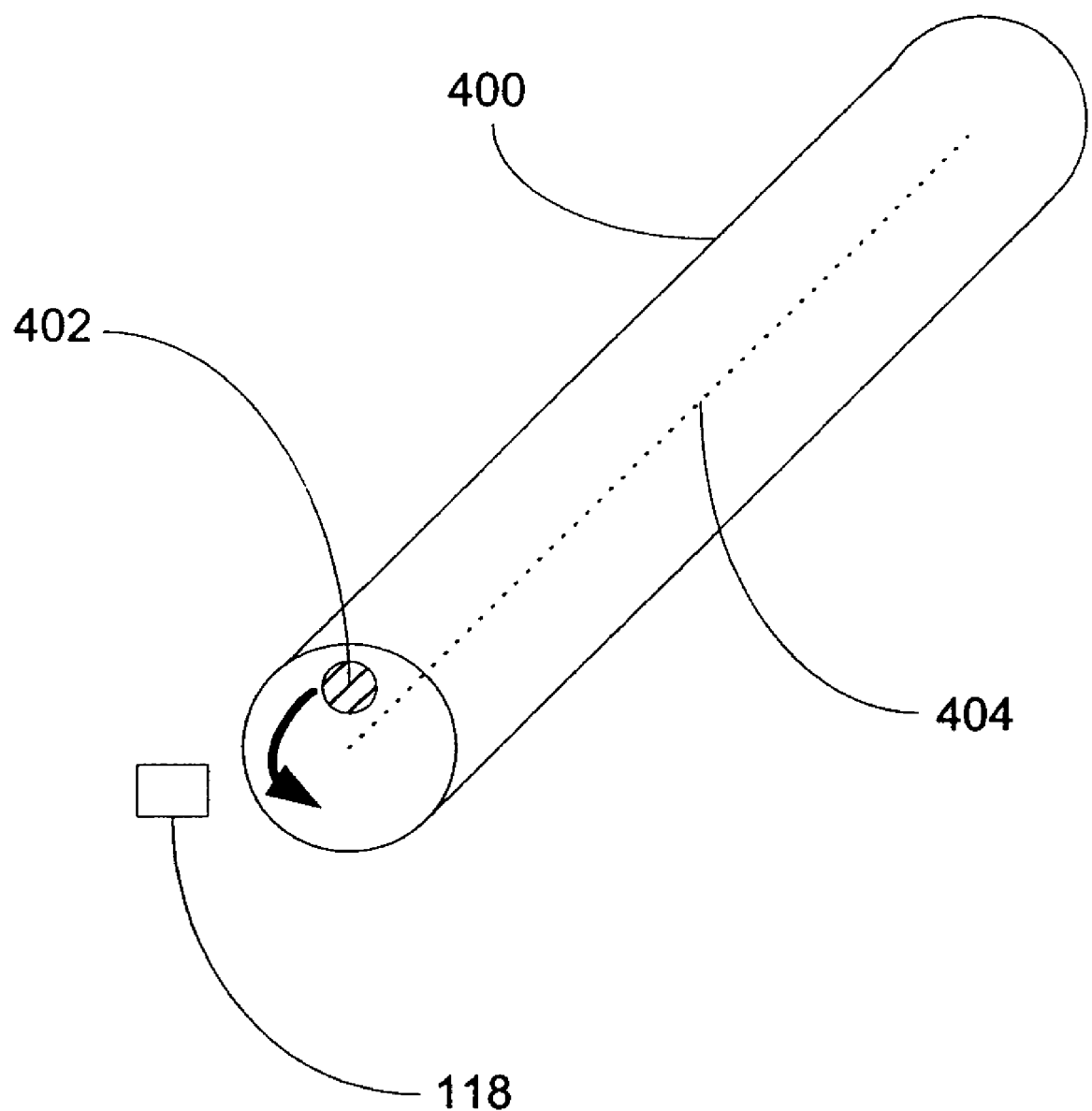
FIG. 4 depicts a speedometer sensor for detecting motion of a snowmobile.

As stated earlier, FIG. 4 depicts an example system for detecting motion of a vehicle. Other systems may provide a similar determination of the motion of a vehicle. Depicted in FIG. 4 is a shaft 400, which may be a trackshaft that drives a snowmobile's track, thereby propelling the vehicle. The shaft 400 is coupled to a track or wheel of the vehicle and rotates when the vehicle is in motion. At the end of the shaft 400, offset from the longitudinal axis 404 of the shaft 400, is a magnet 402. Disposed at a fixed point in proximity to the trackshaft is a speedometer sensor 118. The speedometer sensor 118 possesses a magnetically sensitive element, which yields a signal that is a function of the magnetic field to which it is exposed. For example, the magnetically sensitive element may be a coil that generates a current in response to a change in magnetic flux through the coil. Alternatively, the magnetically sensitive element may be a magnetoresistor, the resistance of which is a function of the magnetic field to which it is exposed. Still further, the magnetically sensitive switch may be a Hall effect switch or a reed switch.

In periods in which the vehicle is in motion, the shaft 400 rotates. The rotation of the shaft 400 changes the position of the magnet 402 relative to the speedometer sensor 118. Accordingly, the speedometer sensor 406 generates a signal with a characteristic (such as voltage, amperage, frequency, or duty cycle) that is approximately proportional to the rotation of the shaft 400 (which is, itself, approximately proportional to the velocity of the vehicle). Thus, the signal returned by the speedometer sensor 118 indicates motion of the vehicle; the signal is communicated to the remote starter module 104 (as shown in FIG. 1), for the purposes described with reference to FIGS. 3A and 3B.

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, the ignition re-try sequency may contain fewer or greater number of attempts at cranking the engine. The engine may be cranked for either longer or shorter periods. Additional safety or security features may be employed, including the integration of an alarm that activates if the remote starter module detects motion of the vehicle in the absence of a key being inserted in the ignition switch and turned to the "run" or "on" condition. Numerous other changes may be made which will readily suggest themselves to those skilled in the art and which are encompassed in the spirit of the invention disclosed and as defined in the appended claims.

The invention claimed is:

1. A snowmobile having an engine, a drive train driven by the engine, and a remote starting system, the remote starting system comprising:
   a remote starting activation switch that transmits a radio frequency signal to a remote starter module to initiate starting the engine, the remote starter module receiving the radio frequency signal from the remote starting activation switch and, in response to receiving the radio frequency signal, causing a starter motor of the snowmobile to crank and start the engine;
   a motion sensor for sensing motion of a component of the drive train; and
   wherein the remote starter module interrupts engine operation upon sensing motion of the drive train component, if insertion of a key into an ignition switch of the snowmobile and the key being turned to an on or run position are not detected.

2. The snowmobile of claim 1, wherein the remote starter module interrupts engine operation in response to motion of the snowmobile, if the driver authorization condition is not detected.

3. The snowmobile of claim 1, wherein the remote starter module interrupts engine operation in response to an engine hood being opened, if the driver authorization condition is not detected.

4. The snowmobile of claim 1, wherein the remote starter module interrupts engine operation in response to a threshold quantity of time having lapsed without a driver authorization condition being detected.

5. The snowmobile of claim 4, wherein the threshold quantity of time corresponds to a period of time required for the engine to overheat from idling.

6. The snowmobile of claim 1, wherein the remote starter module interrupts engine operation when an engine RPM exceeds a predetermined RPM value, the predetermined RPM value being greater than an engine fast idle RPM.

7. The snowmobile of claim 1, wherein the remote starter module interrupts engine operation when an engine RPM exceeds a predetermined RPM value, the predetermined RPM value being in the range of about 2000 RPM to about 3500 RMP.

8. The snowmobile of claim 1, wherein the remote starter module interrupts engine operation when an engine RPM exceeds a predetermined RPM value, the predetermined RPM value being at least about 3000 RPM.

9. The snowmobile of claim 1, further comprising:
   an alternator driven by the engine, the alternator outputting an alternating current signal in response to being driven by the engine;
   wherein the remote starter module executes steps of:
      cranking the engine for a first threshold period of time;
      after expiration of the first threshold period of time, looking for the alternating current signal from the alternator; and
      in response to an absence of the alternating current signal from the alternator, cranking the engine for a second threshold period of time.

10. The snowmobile of claim 9, wherein the remote starter module further executes steps of:
    after expiration of the second threshold period of time, looking for the alternating current signal from the alternator; and
    in response to an absence of the alternating current signal from the alternator, cranking the engine for a third threshold period of time.

11. The snowmobile of claim 1, wherein the remote starter module interrupts engine operation when an engine RPM exceeds a predetermined RPM value, and wherein the remote starter module uses the frequency of an alternating current signal emanating from an alternator of the snowmobile to determine the engine RPM.

12. A method of controlling on/off operation of a snowmobile from a remote location, the method comprising:
    transmitting a radio frequency signal to a remote starter module of the snowmobile to initiate starting of the engine;
    activating a starter motor of the snowmobile with the remote starter module to crank and start the engine;
    determining if a driver authorization condition is detected;
    determining an engine RPM using a frequency of an alternator signal from an alternator of the engine;
    determining whether the engine RPM exceeds an RPM threshold level; and
    interrupting engine operation of the snowmobile if the driver authorization condition is not detected and the engine RPM exceeds the RPM threshold level.

13. The method of claim 12, wherein driver authorization condition includes a key inserted into an ignition switch used for activating the starter motor, the key being turned to the on or run position.

14. The method of claim 12, wherein the RPM threshold level is in the range of about 2000 to about 3500 RPM.

15. The method of claim 12, wherein the RPM threshold level is in excess of an engine fast idle RPM.

16. The method of claim 12, wherein the RPM threshold level is equal to or greater than a clutch engagement RPM of the snowmobile.

17. The snowmobile of claim 1, wherein the motion sensor is a speedometer.

* * * * *